Sept. 27, 1966  A. N. MARSHALL  3,276,029
APPARATUS FOR SPEED INDICATION
Original Filed Feb. 11, 1963  5 Sheets-Sheet 1

INVENTOR.
ARTHUR NIEMEYER MARSHALL
BY Wynne + Finken
ATTORNEY

Sept. 27, 1966      A. N. MARSHALL      3,276,029
APPARATUS FOR SPEED INDICATION Original Filed Feb. 11, 1963      5 Sheets-Sheet 2

INVENTOR.
ARTHUR NIEMEYER MARSHALL

ATTORNEY

Sept. 27, 1966   A. N. MARSHALL   3,276,029
APPARATUS FOR SPEED INDICATION
Original Filed Feb. 11, 1963   5 Sheets-Sheet 3

INVENTOR.
ARTHUR NIEMEYER MARSHALL
BY Wynne + Finken
ATTORNEY Sept. 27, 1966          A. N. MARSHALL          3,276,029

APPARATUS FOR SPEED INDICATION

Original Filed Feb. 11, 1963          5 Sheets-Sheet 5

INVENTOR.
ARTHUR NIEMEYER MARSHALL
BY
Wynne + Finken
ATTORNEY

United States Patent Office 3,276,029
Patented Sept. 27, 1966

1

3,276,029
APPARATUS FOR SPEED INDICATION
Arthur Niemeyer Marshall, 5501 Kingsbury Road,
Richmond, Va.
Original application Feb. 11, 1963, Ser. No. 257,378, now
Patent No. 3,182,331, dated May 4, 1965. Divided and
this application Apr. 23, 1965, Ser. No. 458,508
9 Claims. (Cl. 346—18)

This is a division of application Serial No. 257,378, filed February 11, 1963, now U.S. Patent No. 3,182,331 issued May 4, 1965, and entitled Method of Speed Indication.

This invention relates to apparatus for measuring and indicating the velocity of a moving vehicle.

More particularly, the invention is intended to be used as an appliance for the vehicles of law enforcement officers, enabling them to quickly and accurately check the vehicle speeds of potential violators of highway speed laws including the speed laws of urban localities and highway or turnpike speed laws.

One of the prime objects of the invention is to provide a simplified electromechanical apparatus in the nature of a highly compact unit which may be installed beneath the instrument panel of a police car in ready reach of the officer driving such car and entirely operable with one hand, without the necessity for the officer taking his eyes off of the road or speeding vehicle.

Another important object of the invention is to provide a vehicle speed checking apparatus which will accomplish the same results now obtained by the use of much more expensive electronic equipment of the radar type and without the necessity for "setting up" speed checking equipment at a roadside station with the resultant inconveniences, danger from passing vehicles and the likelihood of being detected in advance by speeding motorists.

Another object is to provide an apparatus of the mentioned character which may be employed in a variety of ways on the road for checking the speeds of violators or potential violators.

Another object is to provide an apparatus of the mentioned type which will be entirely acceptable to state and local law enforcement agencies and to the courts.

Other objects and advantages of the invention will be apparent to those skilled in the art during the course of the following description.

In the accompanying drawings forming a part of this application and in which like numerals are employed to designate like parts throughout the same.

2

In the drawings, wherein for purpose of illustration is shown a preferred embodiment of the invention, the numeral 20 designates a rigid base plate, upon which all of the operating components are mounted. A carriage plate 21 is arranged above the base plate 20 in spaced superposed relation thereto for movement relative to the base plate in opposite directions and in a straight line path, as will be fully described. Near one side thereof, the carriage plate 21 has a depending integral bearing part 22 having a through bore 23, slidably receiving a cylindrical guide rod 24, having its ends rigidly anchored within openings formed in upstanding lugs 25 and 26 on the base plate 20 adjacent the forward and rear ends thereof. The carriage plate 21 is slidable lengthwise of the guide rod 24 and is also pivotal thereon for limited swinging movement toward and away from the base plate 20 upon the axis of the guide rod 24.

Means are provided to cause movement of the carriage plate 21 in a straight line and in one direction upon and relative to the stationary base plate 20, and which movement is in relation to the time interval during which the speed of a vehicle is to be checked over a selected distance course, as will be fully explained. Such means comprises a screw shaft 27 spaced from and parallel to the guide rod 24 and arranged at approximately the same elevation as the guide rod 24 above the base plate 20. The opposite ends of screw shaft 27 are suitably journaled for rotation within upstanding bearing parts 28 of base plate 20, preferably formed integral therewith. A relatively large gear 29 is rigidly secured to the forward end of screw shaft 27, forwardly of base plate 20 and associated elements and this gear meshes with and is driven by a small pinion gear 30, having an intermediate-size gear 31 rigid therewith, both of the gears 30 and 31 rotatably mounted upon a short stub shaft, secured rigidly to a mounting plate 32, in turn suitably rigidly secured to the front faces of lug 25 and bearing part 28.

An accurate constant speed electric motor 33 of a conventional type is bodily rigidly secured at its forward end to the mounting plate 32 and is disposed within an opening 34 of the base plate 20. The armature shaft of motor 33 has a small gear 35 mounted directly thereon and meshing with the reduction gear 31 to operate the train of gears between the motor 33 and screw shaft 27. The motor 33 has built-in conventional speed adjusting means, not shown, which may be operated with a screwdriver to assure extremely accurate operation.

Figure 5:
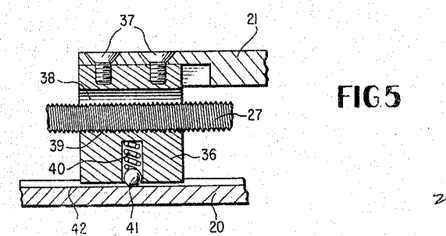
FIGURE 5 is an enlarged fragmentary vertical section taken on line 5—5 of FIGURE 4.

A half nut element 36 is secured rigidly at 37 to the bottom of carriage plate 21 and has a vertically oblong through bore 38 having screw-threads 39 upon its bottom side only for coupling driven engagement with the screw shaft 27, FIGURE 5. The half nut 36 and associated elements are constantly urged upwardly resiliently toward positive engagement with the screw shaft 27 by a recessed coil spring 40 within the bottom portion of the half nut and having its lower end engaging a ball bearing 41 which may roll along a machined groove 42 in the top face of base plate 20. It may be seen that whenever the carriage plate 21 is manually depressed near its side remote from the guide rod 24 that the carriage plate will pivot downwardly upon the axis of the rod 24 and the spring 40 will yield and the threads 39 of the half nut 36 will disengage the threads of screw shaft 27, permitting the carriage plate 21 to be returned quickly manually toward the rear end of the base plate 20 having the elements 26 and 28. Normally, rotation of the screw shaft 27 under influence of the motor 33 and gearing and while the half nut 36 is coupled with the screw shaft 27, causes the carriage plate 21 and all parts mounted thereon to be moved forwardly upon the base plate 20 and along the axis of the guide rod 24, and this movement is representative of time elapsed during the tracking of a speeding vehicle over a selected distance course. The rotational speed of the clock motor 33, the reduction gearing, and the number of threads per inch on the screw shaft 27, such as 40 threads per inch are all factors of design which contribute to the result of causing the carriage plate 21 to move along the screw shaft 27 a linear distance representative of the passage of an interval of time. In practice, 2½ inches of movement of the carriage plate 21 along the screw shaft 27 may represent one minute of elapsed time. This factor may be varied somewhat, as found desirable, within the scope and spirit of the invention.

Figure 10:
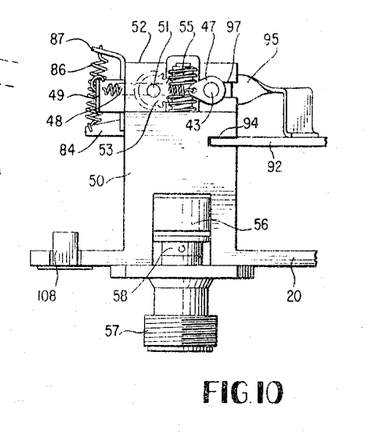
FIGURE 10 is a fragmentary side elevation, with parts omitted, taken on line 10—10 of FIGURE 4.

Means are also provided in the invention to cause movement of a second element in a straight line path, preferably, but not necessarily, at right angles to the movement of the carriage plate 21 and representative of distance traveled by a vehicle during the elapsing of a given time interval. This means comprises a cylindrical guide rod 43 spaced above the carriage plate 21 and extending normally at right angles to the fixed guide rod 24, and having one end thereof pivoted at 44 upon a vertical pin, projecting through an opening 45 in an upstanding support extension 46 to base plate 20 adjacent one side thereof. The opposite extremity of guide rod 43 is freely disposed and carries a connecting lug 47, attached to a retractile coil spring 48, having its other end attached to a rigid arm 49 of a fixed bracket, rigidly secured to an upstanding block 50, formed integral with the base plate 20, as shown. A screw shaft 51 similar to the screw shaft 27 parallels the guide rod 43 at the same elevation as the latter and has one end journaled for rotation upon the support extension 46 and its opposite end journaled for rotation upon an upstanding wall extension 52 of the block 50. A worm gear 53 is secured to the end portion of screw shaft 51, above block 50, and outwardly of wall extension 52, and this worm gear meshes with and is driven by a worm 55 carried by an upstanding shaft 54 extending through an opening in the block 50 and connected with and driven by the output component of an electromagnetic clutch 56, mounted within an internal chamber or recess of the block 50, FIGURE 10. The electromagnetic clutch 56 is conventional and need not be described in detail. A fitting 57 rigidly secured to the bottom of base plate 20 houses the input rotary component 58 of clutch 56, which input component is in turn connected with and driven by a flexible shaft 59, connected with a rotary element of the vehicle transmission and therefore driven in a manner similar to an ordinary speedometer (odometer) cable or shaft. In fact, it is contemplated to utilize a dual outlet fitting on the vehicle transmission, not shown herein, one branch of which may be connected with a speedometer shaft and the other branch of which receives the shaft 59. Consequently, when the vehicle is in motion, the input shaft of clutch 56 is continuously driven but rotation is not imparted to the worm 55 until the electromagnetic clutch is energized by switch and circuit means to be described.

A carriage head 60 has a first opening slidably receiving the guide rod 43 and is provided in its opposite side with an arcuate recess 61 having screw-threads for coupling engagement with the adjacent screw shaft 51. Consequently, when the elements 43 and 51 are parallel and the threads of recess 61 are engaged with the threads of screw shaft 51, rotation of the latter will drive the carriage head 60 longitudinally of the screw shaft in one direction, at right angles to the path of movement of carriage plate 21. A retractile coil spring 62 has one end secured to an extension 63 of carriage head 60 and its other end secured at 64 to fixed wall extension 52, whereby the spring resists movement of the carriage head 60 in one direction and causes automatic return of the carriage head in the opposite direction as will be further described. Carriage head 60 has a depending rigid cylindrical pin extension 65 fixedly mounted thereon and movable therewith for an important purpose to be described.

Figure 2:
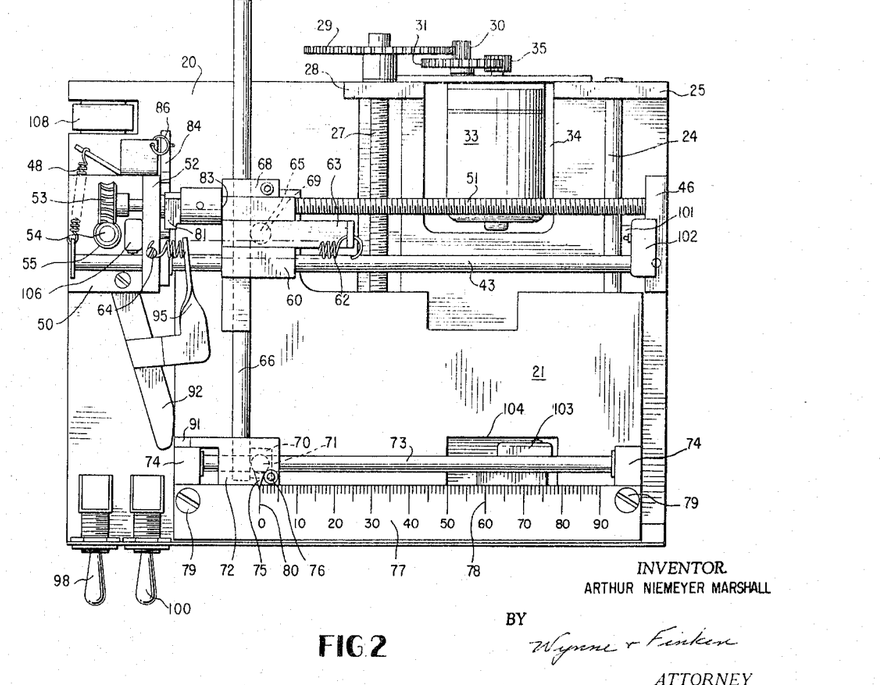

A cylindrical indicator arm or rod 66 is slidable within a through bore 67 of a swivel block 68, pivotally mounted upon carriage plate 21 by means of an upstanding pivot pin 69 adjacent one side of rod 66 and offset therefrom, FIGURE 2. The swivel block 68 thus bodily carries the rod 66 and the latter is disposed above carriage plate 21, and is slidable and swingable relative to the carriage plate 21 in a plane parallel thereto by virtue of its connection with the swivel block 68. The rod 66 of course moves with carriage plate 21 under influence of screw shaft 27 and associated elements.

The rearward end of indicator rod 66 has an integral lateral extension 70 rigid therewith, pivoted by a pin 71 to an indicator head 72, slidable upon a guide rod 73, having its ends anchored to upstanding lugs 74 rigid with carriage plate 21 at the opposite sides thereof and near the rear end of the carriage plate. The pivot pin 71 depends rigidly from the indicator head 72 so as to form a pivotal connection between the indicator head and the offset extension 70 of rod 66. With reference to FIGURE 2, the axes of the offset pivot elements 69 and 71 are in alignment and their degree of offset from the rod 66 is equal. The indicator head 72 carries a pointer 75 and a small upstanding manual operating handle 76 adjacent the pointer to facilitate swinging the rod 66 and sliding the indicator head 72 along the guide rod 73. The elevation and the pivotal plane of the rod 66 above carriage plate 21 and below carriage head 60 is such that one side of the rod 66 may strike or engage the depending pin extension 65 of carriage head 60 during the use of the apparatus, FIGURE 3.

An indicator scale 77 graduated in miles per hour by means of linear scale markings 78 extends parallel to guide rod 73 for coaction with pointer 75. The scale 77 is secured rigidly at 79 to lugs 74 of carriage plate 21, and therefore the scale moves with the carriage plate and associated elements along the axis of screw shaft 27 during the operation of the apparatus. The zero graduation 80 on the linear velocity scale is in alignment with the pivot elements 69 and 71 and also on alignment with the pin extension 65 when the rod 66 is at right angles to rod 43 and parallel to rod 24 and when the carriage head 60 is in the returned position shown in FIGURE 2.

Means are provided to assure quick and accurate resetting or "zeroing" of the apparatus after a reading has been made on the scale 77 and prior to checking the speed of another vehicle and enabling this zeroing operation in a semi-automatic manner by the use of one hand of the operator, without the necessity for him to remove his eyes from the road.

Figures 6, 7, 7A, 9:
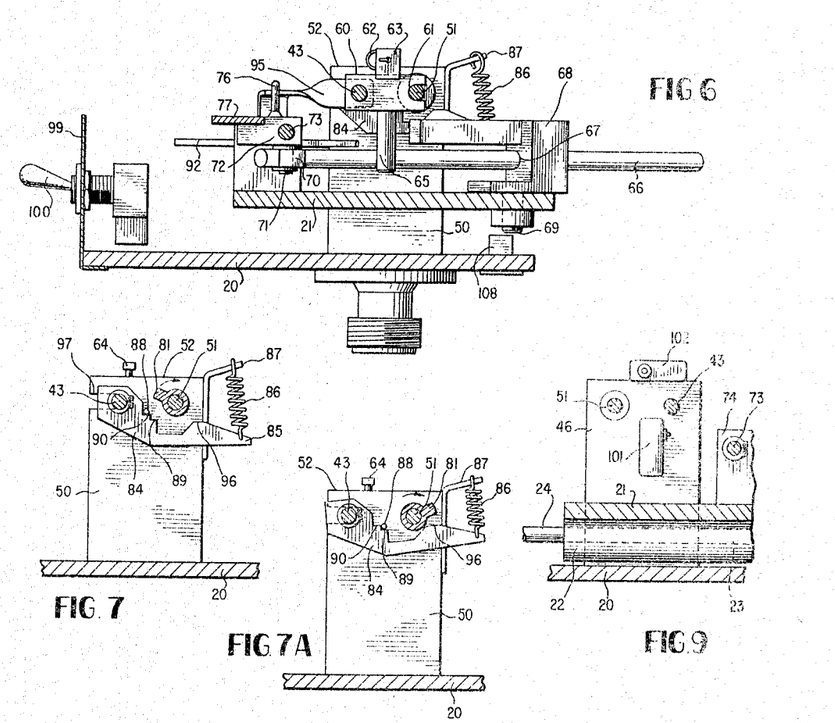
FIGURE 6 is a vertical section taken on line 6—6 of FIGURE 3.
FIGURE 7 is a fragmentary vertical section taken on line 7—7 of FIGURE 3.
FIGURE 7a is a similar view showing the parts illustrated by FIGURE 7 just prior to assuming their positions in FIGURE 7.
FIGURE 9 is a fragmentary vertical section taken on line 9—9 of FIGURE 4.

Such means includes an eccentric cam 81 rigidly mounted upon screw shaft 51 and having a hub 82 providing a stop shoulder 83 to arrest the return movement of carriage head 60 under influence of spring 62. A stepped latch arm 84, FIGURES 7 and 7a, is pivoted to guide rod 43 and projects forwardly thereof and beneath screw shaft 51 and has a free extension 85 urged upwardly by a rotractile spring 86 having its upper end secured to a projection 87 rigid with the block 50. A small detent pin 88 rigid with the block 50 and projecting from the inner side thereof is engageable with steps 89 and 90 of latch arm 84 as shown in FIGURES 7 and 7a, when the indicator head 72 is returned manually by theoperator to the fullest possible extent, FIGURE 8, so that the head 72 abuts the lug 74 and the pointer 75 is slightly to the left of the zero scale graduation, a lateral extension 91 on indicator head 72 will engage a swingable lever 92, pivoted at 93 within a slot 94 of block 50, thus pushing the lever 92 in the direction of the arrow, FIGURE 8. An L-shaped arm 95 rigid with lever 92 is pivotally connected with guide rod 43 near and inwardly of latch arm 84. Consequently, when lever 92 is swung outwardly by indicator head 72, FIGURE 8, upon the axis of pivot 93, the arm 95 will draw the adjacent end of guide rod 43 away from screw shaft 51 and cause separation of the threads of this screw shaft from the threads arcuate recess 61, thus freeing carriage head 60 for return under influence of spring 62.

Figure 8:
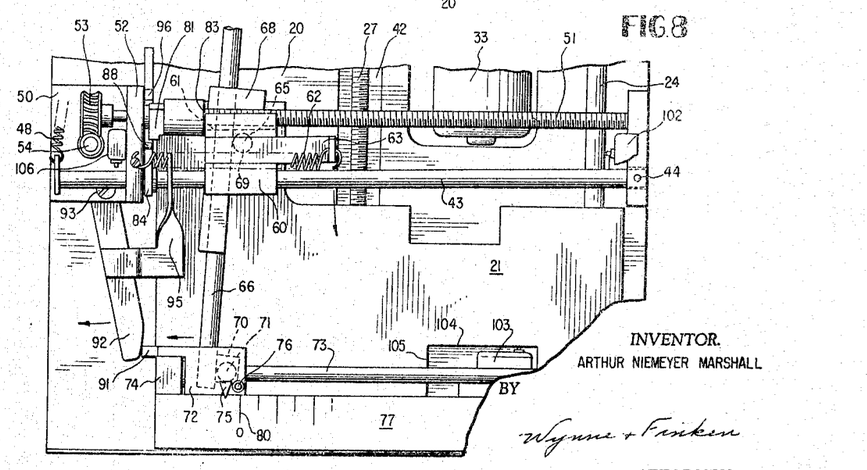
FIGURE 8 is a further fragmentary plan view of the apparatus during the resetting or zeroing operation thereof.

As the above takes place, that is, when the guide rod 43 is shifted upon its pivot pin 44 into slight divergent relation with screw shaft 51, spring 86 will urge latch arm 84 upwardly, FIGURE 7a, causing detent pin 88 to engage step 89 and latch guide rod 34 and associated parts in the position shown in FIGURE 8. Subsequent to this, as will be described, rotation of cam 81 in the direction of the arrows, FIGURES 7 and 7a, will cause such cam to engage cam part 96 of latch arm 84 and depress the latch arm against the force of spring 86, thereby separating detent pin 88 from step 89. At this time, spring 48 will return the free end of guide rod 43 into parallelism with screw shaft 51 and the second step 90 of latch arm 84 will receive detent pin 88 as shown in FIGURE 7, thereby preventing further upward movement of latch arm 84 on its pivotal connection with guide rod 43. Guide rod 43 is swingable and slidable within a slot 97 of wall extension 52 on block 50. This slot supports and stabilizes the otherwise free end of guide rod 43 and positively limits the movement thereof under influence of spring 48. When the guide rod 43 is returned to parallelism with screw shaft 51, the threads of the latter are re-engaged with the threads of carriage head 60.

Thus far, the mechanical construction of the apparatus has been substantially fully described without reference to the overall mode of operation and to the method embodying the invention. The electrical wiring is shown schematically in FIGURE 11 and has been omitted in all of the other drawing figures for simplicity and clarity of illustration. However, the other figures of the drawings do illustrate certain electrical switches, now to be described, which constitute important elements of the apparatus and its operation.

Figure 11:
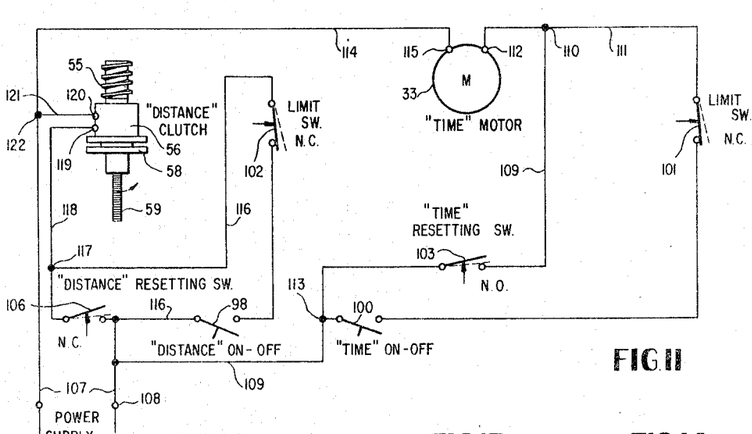
FIGURE 11 is a schematic view of the electrical circuit embodied in the apparatus, FIGURES 12–16 inclusive are diagrams illustrating variations in the practice of the method.

Referring to the drawings in general and FIGURE 11 in particular, a "distance" on and off switch 98 is mounted upon a rear upstanding housing flange 99, secured rigidly to the base plate 20 and having its top edge terminating near the elevation of scale 77. A "time" on and off switch 100 is likewise secured to upstanding flange 99 closely adjacent distance switch 98 so that the officer driving the police car may readily operate both switches with one hand, FIGURE 1.

A normally closed limit switch 101 for carriage plate 21 and associated elements whose movement by screw shaft 27 toward the front of the apparatus represents the passage of time is securely mounted to the inner face of upstanding extension 46 so that its actuator button is in the path of movement of lug 74 of carriage plate 21. This limit switch 101 will open a circuit upon engagement with lug 74 to limit forward travel of carriage plate 21 and thus prevent damage to the apparatus.

A similar normally closed limit switch 102 is secured to the top of extension 46 in the path of travel of extension 73, so that a circuit will be opened by the limit switch 102 upon engagement thereof by the extension 63 to prevent excessive travel of carriage head 60 along screw shaft and guide rod 43. Limit switch 102 also prevents carriage head 60 from moving so far along screw shaft 51 that proper thread disengagement could not occur upon subsequent angling of guide rod 43, FIGURE 8.

A normally open "time" resetting or zeroing switch 103 is suitably mounted upon base plate 20 near the rear end thereof for engagement and actuation by one edge 104 of a recess 105 formed through the rear edge of carriage plate 21. Thus, when carriage plate 21 and associated elements are drawn rearwardly manually toward the flange 99, the edge 104 will cause closing of normally open switch 103 to complete a circuit, allowing proper resetting or zeroing of the parts whose movement by screw shaft 27 represents time elapsed.

A normally closed "distance" resetting or zeroing switch 106 (shown open in FIGURE 11) is mounted atop the block 40 and against the outer side of wall extension 52 so that the actuator of the switch is in the path of swinging movement of guide roll 43 when the latter is returned to parallelism with screw shaft 51 by spring 48. Switch 106 is closed by swinging movement of guide rod 43 away from it, FIGURE 8, to complete a circuit, allowing proper zeroing of carriage head 60 and associated parts whose movement by screw shaft 51 represents distance traveled. The switch 106 is open to interrupt the circuit therethrough at all other times when the guide rod 43 is parallel to screw shaft 51 and in contact with the switch actuator or button.

As shown in FIGURE 11 and also in FIGURE 1, power cable 107 leads from a convenient point below the instrument panel of the vehicle and is electrically connected in the ignition circuit powered by the battery and generator. The cable 107 plugs into the bottom of a receptacle 108, secured to one forward corner of base plate 20. A wire 109 shown only in FIGURE 11 leads from one wire of power cable 107 and is connected in series with normally open switch 103 and is further connected at 110 with a wire 111, in turn connected with one terminal 112 of constant speed motor 33. Wire 111 is connected in series with normally closed limit switch 101 and with "time" on and off switch 100 and is also connected in parallel with wire 109 at 113.

Another wire 114 is electrically connected with time motor terminal 115 and leads to and is connected with the second wire of power cable 107. A wire 116 is connected in series with switches 106 and 98 and 102 and is further connected at 117 with a wire 118 leading to one terminal 119 of electromagnetic clutch 56, the opposite terminal 120 of which is connected with a wire 121, further connected at 122 with the wire 114 and main power cable.

Considering the general mode of operation of the apparatus without reference to the diagrams in FIGURES 12–16 showing the practice of the method, the following takes place.

Assuming that the apparatus is properly zeroed with respect to both movable components 21 and 60 which represent respectively time elapsed and distance traveled, FIGURE 2, and assuming further that the ignition circuit of the vehicle carrying the apparatus is energized, the following may take place. The input shaft 59 and clutch element 58 rotate continuously while the vehicle is in motion because of the direct connection of flexible shaft 59 with a rotary part of the transmission. As long as the "distance" on and off manual switch 98 remains open, FIGURE 11, the electromagnetic clutch 56 remains de-energized and no rotation is imparted to the worm 55. When, however, the switch 98 is closed, the clutch is energized and worm 55 rotates and drives screw shaft 51 and carriage head 60 moves to the right, FIGURE 3, along screw shaft 51 and guide rod 43 until the switch 98 is again opened to interrupt the flow of current to the electromagnetic clutch 56.

Figure 3:
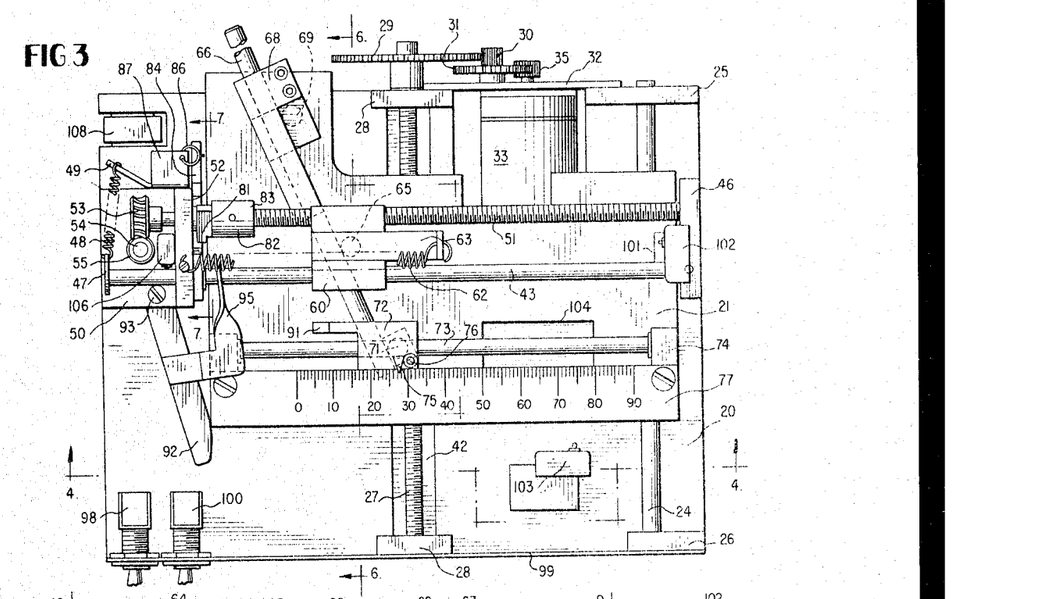
FIGURE 3 is a similar plan view of the apparatus showing the component parts in one speed checking and indicating position.
Figure 4:
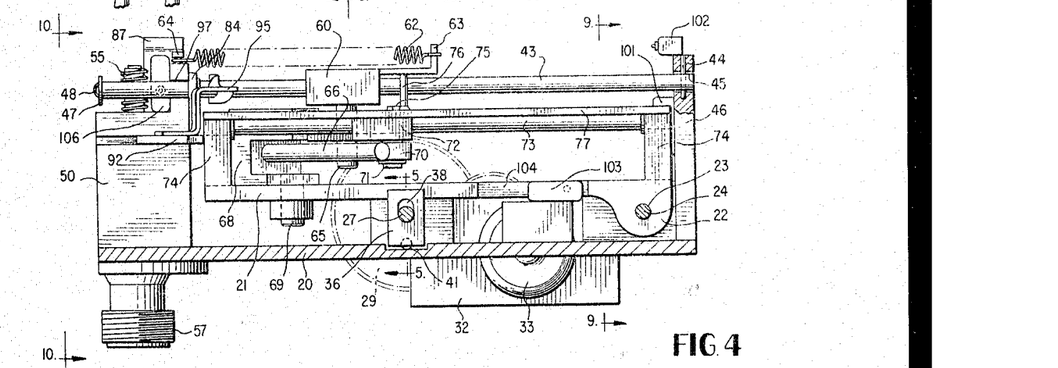
FIGURE 4 is a vertical section taken on line 4—4 of FIGURE 3.

In like manner, when the manual on and off time switch 100 is closed, the motor 33 begins to operate and through the reduction gearing shown in FIGURE 3, screw shaft 27 rotates in a direction to cause movement of carriage plate 21 away from flange 99 and toward the front of the apparatus. Opening of the switch 100 will interrupt the movement of the carriage plate 21. During these operations to cause a given degree of travel of the elements 60 and 21 and the parts carried thereby, the limit switches 101 and 102 remain closed and have no effect upon the operation of the apparatus and which operation is manually controlled by the switches 98 and 100. The limit switches 101 and 102 come into play and open the circuits through the motor 33 and clutch 56, only when the movable elements 21 and 60 are allowed to travel the maximum possible distances along the screw shafts 27 and 51 and must be arrested in their movements to avoid damaging the apparatus. For example, should the operator forget about opening the switches 98 and 100, the limit switches 101 and 102 would automatically stop the movement of carriage plate 21 and carriage head 60 before any damage could take place.

The "distance" and "time" zeroing switches 106 and 103 have no effect upon the above-described movements of the elements 60 and 21 and come into play only when the apparatus is reset or zeroed prior to a subsequent use thereof for checking a speeding vehicle. That is to say, when switch 106 is open, and switch 98 is closed, current flows from one wire of power cable 107 through wire 116, switches 98 and 102, and through wire 118 to terminal 119 of clutch 56 and then through terminal 120, wire 121 and connection 122, back through the other wire of power cable 107 to complete a circuit through the clutch 56. In like manner, while switch 103 remains open and while switch 100 is closed, current flows from power cable 107 through wire 109, switch 100, switch 101, wire 111 to motor terminal 112 and through the opposite terminal 115 of the motor and through wire 114 back to the power cable.

Upon completion of the movements of elements 21 and 60 as shown in FIGURE 3, and after switches 98 and 100 are manually opened, the operator merely shifts the indicator head 72 by means of handle 76 along guide rod 73 to the right, FIGURE 3, until the indicator rod 66 positively contacts the depending pin 65 on carriage head 60 to arrest further movement of the head 72. At this instant, the pointer 75 gives a direct reading in miles per hour on the scale 77 for the vehicle which is being tracked by the law enforcement officer over a selected distance course and during a selected time interval by means of the invention.

To reset or zero the apparatus preparatory to a further use thereof, the operator still utilizing only one hand merely grasps the handle 76 and shifts the indicator head 72 to the left, FIGURE 8, while simultaneously exerting a sufficient downward pressure on carriage plate 21 adjacent handle 76 to cause slight swinging movement of the carriage plate upon the axis of guide rod 24 with which the carriage plate is pivotally connected. This compresses spring 40 and allows disengagement of screwthreads 39 from screw shaft 27 and therefore allows the quick manual return of carriage plate 21 toward elements 26 and 28 and flange 99.

Substantially simultaneously during the above manual resetting of the apparatus, FIGURE 8, the extension 91 will engage lever 92, FIGURE 8, causing guide rod 43 to swing away from screw shaft 51 on its pivot 44 to thereby uncouple the screw-threads of carriage head 60 from screw shaft 51 as previously described. This allows spring 62 to quickly return carriage head 60 against stop shoulder 83.

The shifting of lever 92 by extension 91 causes latching of latch arm 84 in the position shown in FIGURE 7a as previously described. At this time, switch 106 is closed by swinging of guide rod 43 away from it to complete a circuit through the clutch 56, FIGURE 11, notwithstanding the fact that manual switch 98 is open. This causes worm 55 to turn and drive screw shaft 51 until cam 81 engages cam part 96 of latch arm 84, and when this occurs, latch arm 84 shifts to the position shown in FIGURE 7 under influence of spring 48 and guide rod 43 shifts back into parallelism with screw shaft 51, FIGURE 2, and this returns switch 106 to its open position, therefore interrupting the flow of current automatically to clutch 56 and immediately stopping rotation of worm 55 and screw shaft 51. The purpose of this operation regarding switch 106 and associated parts is to enable screw shaft 51 to turn a slight amount while the screwthreads of carriage head 60 are separated from screw shaft 51 so that the mating threads will return to proper full engagement upon release of latch arm 84 by cam 81. That is to say, when the spring 62 returns carriage head 60 against stop shoulder 83, the threads of the carriage head may not be properly positioned for "mesh" with the threads of screw shaft 51, and the additional cycling of screw shaft 51 caused by switch 106 and associated elements assures proper thread engagement and therefore proper resetting or zeroing of the "distance" component of the apparatus.

Similarly, when carriage plate 21 is manually returned to the position shown in FIGURE 8, edge 104 of recess 105 engages and closes normally open switch 103 completing a circuit with motor 33, notwithstanding that manual switch 100 is open, see FIGURE 11. This again assures the proper full re-engagement of screw-threads 39 will the threads of screw shaft 27 when the carriage plate 21 is released by the operator in the fully returned position, FIGURES 2 and 8. The closing of switch 103 by the return movement of carriage plate 21 causes rotation of screw shaft 27 to occur at the time of re-engagement of the threads 39 therewith. Actually, carriage plate 21 is returned manually back of the "zero" point on screw shaft 27, and when switch 103 is closed by this operation and proper thread re-engagement is effected, screw shaft 27 drives the carriage plate 21 back to the "zero" point and then switch 103 reopens and rotation of screw shaft 27 stops. The apparatus is now zeroed as to both the "distance" and "time" moving components thereof.

Figure 1:
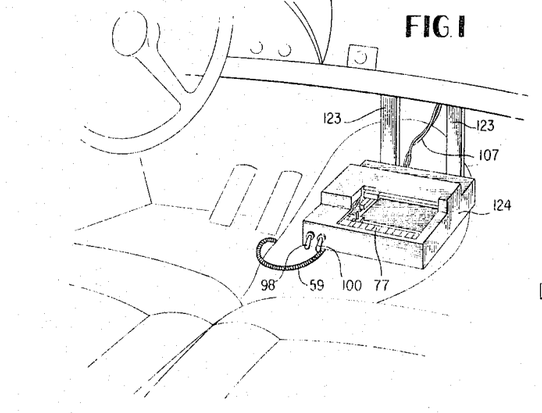
FIGURE 1 is a perspective view of the apparatus installed in a police car or the like, FIGURE 2 is an enlarged plan view of the apparatus with the cover or housing thereof removed and with the component parts positioned at initial or "zeroed" locations.

As shown in FIGURE 1, the apparatus is supported dependingly from the instrument panel of the police car by suitable bracket means 123 of any preferred type. The apparatus also has a removable cover 124 having a top opening to expose the scale 77 and indicator head 72 and associated parts.

With reference to FIGURES 12 through 16 of the drawings, the method of checking the speed of a moving vehicle according to the invention is diagrammatically illustrated in several of a number of possible variations, utilizing the invention apparatus.

Figure 12:
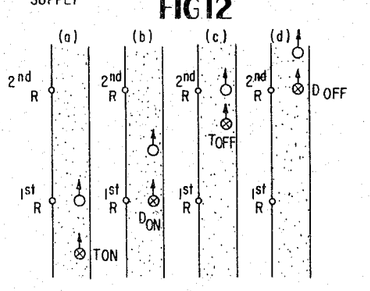

In FIGURE 12, first and second fixed reference points R along a roadway are indicated diagrammatically. Various positions of a speed checking car and a car whose speed is being checked are indicated at (a), (b), (c) and (d) in FIGURE 12. The legend near one side of FIGURE 16 pertains to all of the diagrams of FIGURES 12 through 16. The checking car is of course equipped with the invention apparatus previously described.

In FIGURE 12(a), the car being checked is passing first reference point and time switch 100 of the time measuring unit of trailing checking car is turned on manually. The distance between the two cars is immaterial. In FIGURE 12(b), when the checking car passes the first reference point, distance switch 98 of the distance measuring unit is closed and now both switches 98 and 100 are closed completing circuits through the clutch 56 and motor 33 to cause movement of carriage head 60 and carriage plate 21 as described. In FIGURE 12(c), when the car being checked passes second fixed reference point, time switch 100 is opened, causing movement of carriage plate 21 to cease. In FIGURE 12(d), when checking car passes second reference point along roadway, distance switch 98 is opened causing movement of carriage head 60 to cease. The operator in the checking car utilizing handle 76 now operates the directly readable speed measuring means by shifting indicator head 72 along speed indicating scale 77 until rod 66 strikes pin 65, FIGURE 3. The reading on scale 77 at pointer 75 is the true speed of the car being checked over the selected distance course between first and second reference points and during the selected time interval. The distance between first and second fixed reference points in FIGURE 12 may be any distance, large or small, and the distance between the two cars is immaterial and may vary widely and may even change during the process of checking as indicated at (a), (b), (c) and (d) of FIGURE 12.

Figure 13:
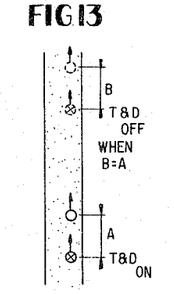

FIGURE 13 shows another of a number of possible ways to utilize the apparatus. No fixed points of reference along the roadway are utilized in the FIGURE 13 method. The distances A and B between the checked and checking cars is equal in both positions of the two cars in FIGURE 13. When the distance A is established, the time and distance switches 100 and 98 are closed simultaneously and remain closed for any selected time and over any selected distance course along the roadway. The switches 100 and 98 are then opened simultaneously at a convenient time and the speed reading on the scale 77 is made in the same manner previously described. With respect to FIGURE 13, between the two positions of the cars indicated, where distances A and B are equal, said distances may differ and change without affecting the results. Also in FIGURE 13, the positions of the checking and checked cars may be reversed.

Figure 14:
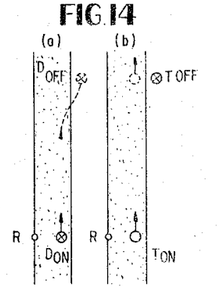

In FIGURE 14, a single fixed reference point is utilized. In FIGURE 14(a), as the checking car passes the fixed reference point, distance switch 98 is closed and further down the roadway, the checking car pulls over and stops and distance switch 98 is opened. In FIGURE 14(b), utilizing rear view mirror in checking car, time switch 100 is closed as checked car passes fixed reference point and time switch is opened when checked car passes parked checking car further down the roadway. The distance between fixed reference point and point of parking of checking car is immaterial and speed of checking car is immaterial. The direct reading on the scale 77 is obtained in the same manner previously described.

Figure 15:
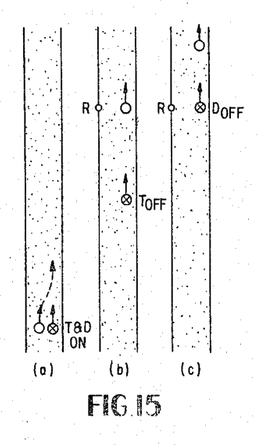

In FIGURE 15, one fixed reference point is used. In FIGURE 15(a), as checked car passes checking car, time and distance switches are closed simultaneously. In FIGURE 15(b), as checked car passes fixed reference point, time switch is opened in checking car. In FIGURE 15(c), as checking car passes reference point, distance switch 98 is opened and reading is taken on scale 77. This reading may be taken at any time after checking car passes fixed reference point and speed of checking car is immaterial and its distance from checked car on the chosen course is immaterial.

Figure 16:
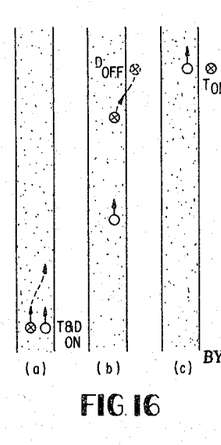
Figure 17:
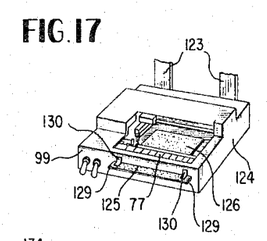
FIGURE 17 is a perspective view of the apparatus on a reduced scale showing an optional modification of the invention which facilitates making a permanent record of the speed indicated by the apparatus.
Figure 18:
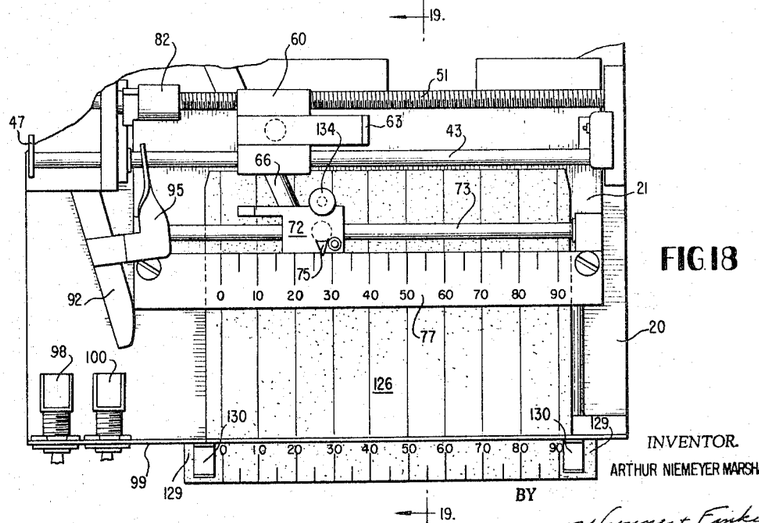
FIGURE 18 is a fragmentary plan view of the apparatus and a record card employed therewith, parts omitted.
Figures 19, 20:
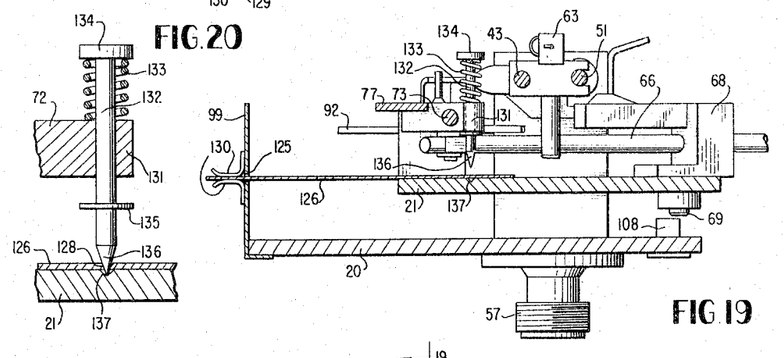
FIGURE 19 is a fragmentary vertical section taken on line 19—19 of FIGURE 18.
FIGURE 20 is an enlarged fragmentary vertical section through a record card punch pin and associated elements.

In FIGURE 16, no reference point is used. Checking car passes checked car at FIGURE 16(a) and time and distance switches are closed simultaneously. In FIGURE 16(b), checking car pulls off road and stops ahead of speeding checked car and distance switch 98 is opened. In FIGURE 16(c), as checked car passes parked checking car, time switch 100 is opened and reading on scale 77 is obtained in the described manner.

The concept of stationary spaced reference points along the roadway as described in conjunction with FIGURES 12 through 16 is intended to include the utilization of visible lines painted on the roadway at desired intervals by the law enforcement authorities.

Additional ways of utilizing the apparatus on the highway will be readily apparent to those skilled in the art without the necessity for further illustrations in the drawings or a further description. It is possible to check accurately the speed of a vehicle moving at an opposite direction to the checking vehicle by means of fixed reference points and points of passage of the two vehicles and by utilizing the two switches 98 and 100. It is never necessary for the checking car to trail the speeding car at a given distance or at a definite speed relative to the speeding car and by utilizing the apparatus in the manner described, the police officer may always keep his hand on the steering wheel and his eyes on the road and he may effect the speed check in a very efficient, accurate and safe manner, as should now be obvious.

An optional feature of the invention is shown as a modification thereof in FIGURES 17–21 of the drawings. This feature involves the provision of means enabling the making and keeping of a permanent record of each speed measurement and indication taken by the apparatus as above-described. The structure of the apparatus remains substantially unchanged except for some minor additions.

Figure 21:
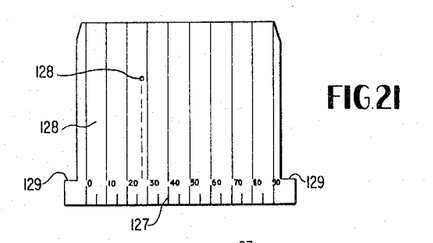
FIGURE 21 is a plan view of a record card employed in the invention.

According to the modification, the front housing wall 99 is provided with a horizontal slot 125 to receive and guide a suitable record card 126 which may have printed thereon a speed indicating scale 127 adapted for alignment or registry vertically with the markings of the apparatus scale 77. To assure this registry in all positions of the carriage plate 21, FIGURE 18, the card 126 is cut accurately with relation to the slot 125 to slide under the scale 77 and be aligned therewith during movements of the carriage plate 21. The forward portion of the card 126 lies slidably upon the upper face of the carriage plate 21, FIGURE 19, and the card remains stationary during use relative to the moving carriage plate. The scale markings on the card are extended for its full length as shown in FIGURE 21 to render the reading of a given record mark 128 clear at a glance. The card has a pair of square shoulders 129 formed thereon at its rear end adapted to abut the outer face of housing wall 99 to further position the card with relation to the scale 77. Spring clips 130 are mounted upon the housing wall 99 adjacent opposite ends of the slot 125 to receive and secure the record card in place during use.

The previously-described movable indicator head 72 carries at its forward side according to this modification a vertical sleeve extension 131, receiving therein a reciprocatory scribe or punch pin 132 biased upwardly by a spring 133 and having an operating button 134 on its top end and a stop collar 135 near its lower end, which lower end is pointed as shown at 136. If preferred, the punch pin 132 could be a pencil or ink marking element of any suitable sort. The top face of carriage plate 21 may be provided with a transversely extending groove 137 directly below the punch pin 132 to accommodate the point of the latter and assure that the point of the pin will produce a clearly visible opening 128 in the record card, upon manual depression of the punch pin.

When this optional feature of the invention is used, the overall operation of the apparatus for checking the speed of a vehicle is exactly the same as previously described. However, upon each use of the apparatus, a fresh record card 126 is placed in the same and when the operator makes a reading on the scale 77 as depicted in FIGURE 3 or in FIGURE 18, he merely depresses the pin 132 with his finger to form the mark or opening 128 in the record card, thereby making a permanent record of the speed reading or indication. The spring 133 automatically returns the pin 132 to the elevated position shown in FIGURE 19 as soon as the operator releases the pin, thus enabling the apparatus to be reset or zeroed in the manner previously described without any interference by the pin 132 and associated elements. The construction is simplified and does not interfere in any way with the normal use of the apparatus without a record card, if preferred. Other suitable schemes may be employed for positioning the record card relative to the scale 77 during use and the present arrangement is illustrative only.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. Apparatus for use upon a motor vehicle for checking the speed of another vehicle comprising a first carriage means having linear movement from a zero position representative of elapsed time, a second carriage means having linear movement from a zero position representative of distance traveled, control means for selectively setting into advancing motion and stopping said first and second carriage means beyond their respective zero positions to establish the average speed of said another vehicle, speed indicator means connected with said first and second carriage means and having its speed indicating position determined by the stopped positions of said first and second carriage means, return means for retracting said first and second carriage means to a position behind their respective zero positions, reset means responsive to the presence of said first and second carriage means behind their respective zero positions to advance said first and second carriage means to their respective zero positions.

2. Apparatus as defined in claim 1 and including means for producing a permanent record of the established average speed of said another vehicle.

3. Apparatus as defined in claim 2 and wherein said means for producing a permanent record includes a record card mountable upon said apparatus and means to produce a record on said card identifying said established average speed.

4. Apparatus for use upon one motor vehicle for checking the velocity of another vehicle comprising relatively stationary support means mountable upon said one vehicle, a first carriage means on said support means adapted for linear movement from a zero position relative thereto, a second carriage means on the support means adapted for linear movement from a zero position relative thereto independently of the movement of the first carriage means and in a direction different from the direction of movement of the first carriage means, mechanical directly readable velocity indicator means on said apparatus operable subsequent to movements of the first and second carriage means, the movement of one of said carriage means representing the elapsing of time and the movement of the other carriage means representing distance traveled and said reading being the ratio of distance to time represented by said movements of the first and second carriage means, and electromechanical control and operating means for said first and second carriage means including a pair of manual switches operable to initiate and terminate the movements of the first and second carriage means, return means for retracting said first and second carriage means to a position behind their respective zero positions, reset means responsive to the presence of said first and second carriage means behind their respective zero positions to advance said first and second carriage means to their respective zero positions.

5. Apparatus for use in one automobile for checking the speed of another automobile or the like comprising a supporting member mountable in said one automobile, electric motor means on said member adapted to be powered by the electrical system of said one automobile, a first manual switch on said member to start and stop said motor means, a rotary element on said member adapted to be turned by a continuously rotating part of the power train of said one automobile, electric clutch means including a rotary part adapted when energized to transmit rotation from said element to said rotary part, a second manual switch on said member operable to energize and de-energize said clutch means, a first carriage means adapted for linear movement from a zero position on said member driven by the electric motor means, the linear movement of the first carriage means representing the elapsing of time, a second carriage means on said member adapted for linear movement thereon from a zero position substantially at right angles to the first carriage means and driven by said clutch means, the linear movement of the second carriage means representing distance traveled, and manually operable directly readable speed indicator means including a linear velocity scale and connected with the first and second carriage means and having its speed indicating position established by the linear movements of the first and second carriage means, return means for retracting said first and second carriage means to a position behind their respective zero positions, reset means responsive to the presence of said first and second carriage means behind their respective zero positions to advance said first and second carriage means to their respective zero positions.

6. Apparatus for checking speed of a vehicle comprising supporting means mountable upon a vehicle, a first carriage means mounted upon said supporting means for linear movement thereon, a second carriage means on the supporting means for linear movement thereon independently of the first carriage means substantially at right angles thereto, velocity indicating means associated with the first and second carriage means and operable subsequent to movements of the first and second carriage means to furnish a direct indication of vehicle speed, electric motor means drivingly connected with the first carriage means to cause movement thereof in one direction when energized, electromechanical rotary driving means connected with the second carriage means to cause movement thereof in one direction when energized, manual switch means on said supporting means operable to control said electric motor and electromechanical means, semi-automatic electromechanical means connected with the first and second carriage means to accomplish uniform resetting of the latter subsequent to a vehicle speed checking operation and preparatory to another such operation, each of said electric motor means and electromechanical means including a rotary screw shaft and each of said first and second carriage means including a screw-threaded part shiftable into and out of coupled engagement with said screw shaft, said first carriage means being pivoted to said supporting means and rockable manually to disengage the screw-threaded part thereof from said screw shaft to allow quick manual return of the first carriage means, mechanical means in the path of movement of the first carriage means to effect disengagement of the screw-threaded part of the second carriage means from said screw shaft upon manual return of the first carriage means, and said semi-automatic means including a pair of resetting electrical switches one each for said first and second carriage means and operable to cause rotation of said screw shafts a sufficient amount to cause full re-engagement of said screw-threaded parts and screw shafts.

7. Apparatus for measuring and indicating the velocity of a vehicle comprising a relatively stationary supporting member mountable within an automotive vehicle, an electric motor and gearing secured to said member and adapted to be powered by the electrical system of the automotive vehicle, a first screw shaft journaled upon said member and connected with and turned by said gearing, a first carriage means having movable guided engagement with said member and including a screw-threaded part adapted to be coupled with the first screw shaft and driven thereby, whereby rotation of the first screw shaft effects linear movement of the first carriage means in one direction representative of the elapsing of time, the first carriage means being manually releasable from the first screw shaft and manually returnable to an initial position on said member, electrical switch means on said member actuated by the first carriage means upon the manual return of the latter to cause rotation of the first screw shaft a sufficient amount to allow re-engagement of the screw-threaded part therewith, a linear velocity scale on the first carriage means, a manually operable indicator means pivotally secured to the first carriage means including a pointer shiftable lengthwise of said scale, a rotary element on said member adapted to be coupled with and turned by a continuously rotating part of said automotive vehicle power train, an electromagnetic clutch including a rotary output part connected with said element and adapted when energized to transmit rotation from said element to said output part, a second rotary screw shaft journaled upon said member and extending substantially at right angles to the first screw shaft, gearing interconnecting said output part and second rotary screw shaft, a second carriage means having movable guided engagement with said member and including a screw-threaded part adapted to be coupled with the second screw shaft and driven thereby, whereby rotation of the second screw shaft effects linear movement of the second carriage means in one direction representative of distance traveled, the second carriage means being manually releasable from the second screw shaft, resilient means connected with the second carriage means to return it to an initial position on said member, electromechanical means including a switch on said member to cause rotation of the second screw shaft a sufficient amount to allow re-engagement of the screw-threaded part of the second carriage means therewith, the second carriage means including an extension in the path of movement of said indicator means to limit the movement thereof subsequent to movements of the first and second carriage means by said screw shafts, and electrical circuit means including a pair of manual switches operable to start and stop said motor and to energize and de-energize said clutch.

8. Apparatus for measuring and indicating the speed of a vehicle comprising a supporting base member attachable to a structural part of an automobile, a first guide rod and rotatable screw shaft mounted upon said member in parallel spaced relation, an electric motor and reduction gearing mounted upon said member and drivingly connected with said first screw shaft, a carriage plate rockably and slidably connected with said first guide rod and having a screw-threaded part engageable with said first screw shaft and disengageable therefrom upon rocking of the carriage plate in one direction on the axis of the first guide rod, resilient means urging said screw-threaded part toward coupling engagement with said first screw shaft and yieldable to allow disengagement of the part from said screw shaft, a linear speed indicating scale carried by said carriage plate and bodily movable therewith longitudinally of the first guide rod and screw shaft during turning of the latter, an indicator arm slidably and pivotally secured to the carriage plate and movable therewith, an indicator head including a pointer pivoted to the indicator arm, a guide rod on said carriage plate paralleling said scale and slidably connected with said indicator head to guide the same along the scale during pivoting of the indicator arm, a second guide rod and rotatable screw shaft mounted upon said member in spaced parallel relation above said carriage plate and substantially at right angles to said first guide rod and screw shaft, one end of the second guide rod pivoted to said member whereby the other end of the second guide rod is swingable toward and away from the second screw shaft, a carriage head slidable upon the second guide rod and having a screw-threaded part adapted for coupling engagement with the second screw shaft and disengageable therefrom upon swinging of the second guide rod on its pivot away from the second screw shaft, said carriage head including a part depending therefrom in the path of swinging movement of said indicator arm to limit movement thereof and establish a reading on said scale subsequent to movements of the carriage plate and carriage head caused by rotation of said first and second screw shafts, a rotary element and gearing connected with the second screw shaft to turn the same, pivoted lever means on said member and connected with the second guide rod to swing the same away from the second screw shaft, an extension on said indicator head engageable with said lever means to turn the same upon its pivot upon shifting of the indicator head to one end of said scale, cam latch means pivoted to the second guide rod to releasably latch the latter in separated relation from the second screw shaft, a cam on the second screw shaft engageable with said latch means to release the same, a spring connected with the second guide rod to return the same toward the second screw shaft upon release of the latch means by said cam, and electrical control circuit means for said apparatus including a pair of manual switches operable to initiate and terminate the operation of said electric motor and rotary element and a pair of limit switches in the path of movement of said carriage plate and head to interrupt the operation of said motor and said rotary element to prevent excessive travel of said carriage plate and head under influence of said first and second screw shafts and another pair of switches engageable respectively with said carriage plate and second guide rod to cause turning of the first and second screw shafts a sufficient amount to allow proper re-engagement of the screw-threaded parts of the carriage plate and carriage head therewith preparatory to a new cycle of operation of the apparatus.

9. Apparatus for use upon a motor vehicle for checking the speed of another vehicle comprising a first carriage means having linear movement from a zero position representative of elapsed time, a second carriage means having linear movement from a zero position representative of distance traveled, control means for selectively setting into advancing motion and stopping said first and second carriage means beyond their respective zero positions to establish the average speed of said another vehicle, speed indicator means connected with said first and second carriage means and having its speed indicating position determined by the stopped positions of said first and second carriage means, return means for retracting said first and second carriage means to a position adjacent their respective zero positions, reset means operable when said first and second carriage means are adjacent their respective zero positions to move said first and second carriage means to their respective zero positions.

References Cited by the Examiner

UNITED STATES PATENTS

| 1,450,410 | 4/1923 | Cox | 235—61 |
| 2,903,322 | 9/1959 | Webster | 346—18 |

FOREIGN PATENTS

| 115,558 | 5/1918 | Great Britain. |

RICHARD B. WILKINSON, *Primary Examiner.*

LEO SMILOW, *Examiner.*

J. W. HARTARY, *Assistant Examiner.*